United States Patent
Freer

(10) Patent No.: US 7,825,537 B2
(45) Date of Patent: Nov. 2, 2010

(54) INDUCTIVE POWER TRANSFER SYSTEM AND METHOD

(75) Inventor: Benjamin Freer, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 113 days.

(21) Appl. No.: 12/271,023

(22) Filed: Nov. 14, 2008

(65) Prior Publication Data

US 2010/0123451 A1 May 20, 2010

(51) Int. Cl.
*H05K 1/02* (2006.01)
*H01F 21/04* (2006.01)
*B60L 9/00* (2006.01)

(52) U.S. Cl. ............................ 307/42; 336/115; 701/22

(58) Field of Classification Search .................. 701/22; 180/2.1; 307/42; 191/10; 336/115, 116, 336/123
See application file for complete search history.

(56) References Cited

U.S. PATENT DOCUMENTS

| | | | |
|---|---|---|---|
| 5,396,538 A | 3/1995 | Hong et al. | |
| 5,831,841 A * | 11/1998 | Nishino | 307/10.1 |
| 6,301,128 B1 | 10/2001 | Jang et al. | |
| 6,421,600 B1 * | 7/2002 | Ross | 701/117 |
| 6,489,745 B1 | 12/2002 | Koreis | |
| 6,515,878 B1 | 2/2003 | Meins et al. | |
| 6,683,438 B2 | 1/2004 | Park et al. | |
| 6,912,137 B2 | 6/2005 | Berghegger et al. | |
| 7,375,493 B2 | 5/2008 | Calhoon et al. | |

* cited by examiner

*Primary Examiner*—Shawn Riley
(74) *Attorney, Agent, or Firm*—Fox Rothschild, LLP; Robert J. Sacco

(57) ABSTRACT

An inductive power transfer system includes a base unit comprising a first inductive element for providing input power to a second inductive element of a target unit providing output power, a positioning structure provided on at least one of the base unit and the target unit for removably positioning the second inductive element at a predetermined orientation and distance relative to the first inductive element, a switch element configured for selectively applying a time varying electric current to the first inductive element to produce a time varying magnetic field for inducing an electric current in the second inductive element, and a control circuit for monitoring one parameter indicative of an efficiency of power transfer and automatically selectively adjusting at least one characteristic of the time varying electric current responsive to the parameter to maximize an efficiency of power transfer from the base unit to the target unit.

28 Claims, 4 Drawing Sheets

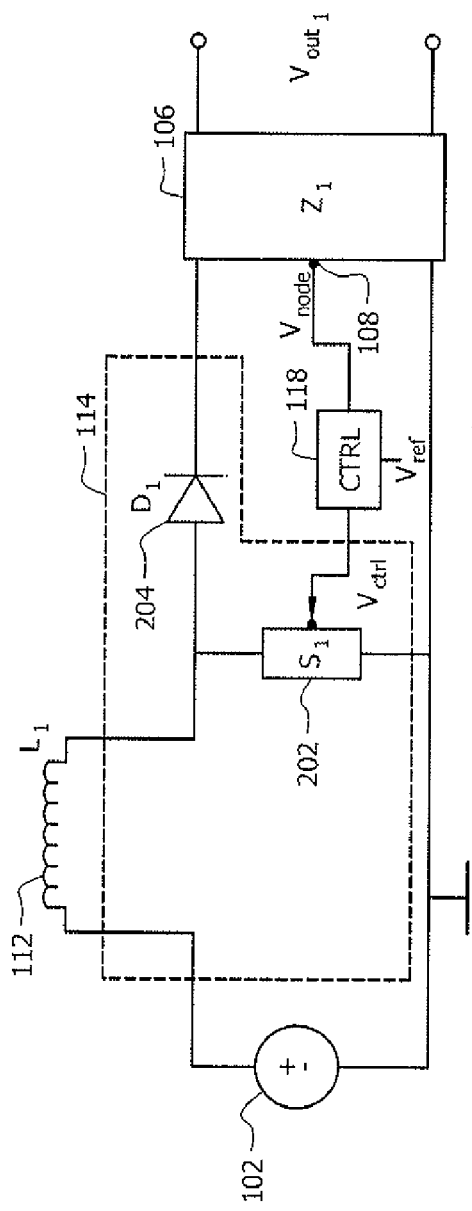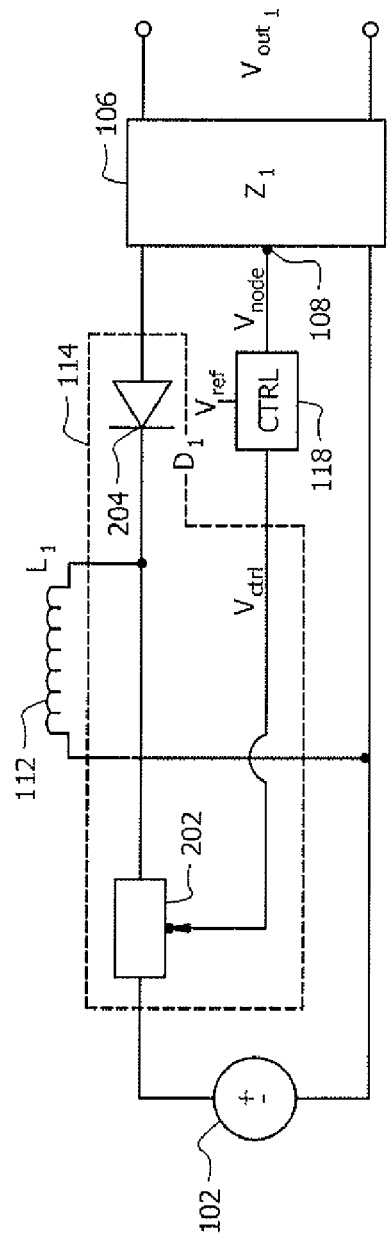
FIG. 3A  300
FIG. 3B  350

INDUCTIVE POWER TRANSFER SYSTEM AND METHOD

FIELD OF THE INVENTION

The present invention relates to supplying electrical power wirelessly, and more particularly to systems and method for inductively supplying electrical power.

BACKGROUND

Inductive power transfer has been proposed as one method for wirelessly providing electrical power. In such a power transfer method, mutual inductance generally results in power being wirelessly transferred from a primary coil (or simply "primary") in a power supply circuit to a secondary coil (or simply "secondary") in a secondary circuit. Typically, the secondary circuit is electrically coupled with a device, such as a lamp, a motor, a battery charger or any other device powered by electricity. The wireless connection provides a number of advantages over conventional hardwired connections. A wireless connection can reduce the chance of shock and can provide a relatively high level of electrical isolation between the power supply circuit and the secondary circuit. Inductive couplings can also make it easier for a consumer to replace limited-life components. For example, in the context of lighting devices, an inductively powered lamp assembly can be easily replaced without the need to make direct electrical connections. This not only makes the process easier to perform, but also limits the risk of exposure to electric shock.

In general, the use of inductive power has been limited to niche applications, such as for connections in wet environments, due to power transfer efficiency concerns. Several methods have been proposed to improve the efficiency of the inductive coupling, typically focused on the configuration of the primary and secondary coils. Such methods typically require not only close proximity of the primary and the secondary coils, but also careful tuning of the coil designs to match with one another to maximize the efficiency of the inductive coupling. This has placed significant limitations on the overall design and adaptability of inductively powered devices by increasing cost and complexity of conventional designs. Furthermore, even when such complex designs are used, the amount of power that can be transferred is further limited, reducing the amount of efficiency gains.

SUMMARY

Embodiments of the present invention provide systems and methods for inductively transferring power. For example, in a first embodiment of the present invention, a method is provided for inductively transferring power from a base unit providing input power to a target unit providing output power, where the base unit and the target unit are electrically isolated. The method can include positioning a second inductive element of the target unit within a predetermined distance of a first inductive element of the base unit and applying a time varying electric current to the first inductive element to produce a time varying magnetic field, the time varying magnetic field inducing an electric current in the second inductive element. The method can also include monitoring at least one parameter indicative of an efficiency of power transfer from the base unit to the target unit and automatically adjusting at least one characteristic of the time varying electric current responsive to the parameter to maximize an efficiency of power transfer from the base unit to the target unit.

In a second embodiment of the present invention, an inductive power transfer system is provided. The system can include a base unit including a first inductive element configured for providing input power to a second inductive element of a target unit providing output power, where the base unit is electrically isolated from the target unit. The system can also include a positioning structure provided on at least one of the base unit and the target unit for removably positioning the second inductive element at a predetermined orientation and distance relative to the first inductive element. The system can further include a switch element for selectively applying a time varying electric current to the first inductive element to produce a time varying magnetic field, the time varying magnetic field inducing an electric current in the second inductive element. The system can also include a control circuit configured for monitoring at least one parameter indicative of an efficiency of power transfer from the base unit to the target unit and for automatically adjusting at least one characteristic of the time varying electric current responsive to the parameter to maximize an efficiency of power transfer from the base unit to the target unit.

In a third embodiment of the present invention, A DC-DC converter is provided. The converter can include a input circuit for receiving a DC input voltage and an output circuit electrically coupled to the input circuit. The output circuit can comprise a load sub-circuit electrically coupled to a converter sub-circuit including at least a first inductive element and at least one switch element having a switch control node responsive to a first control voltage for selectively alternating the switch element between an open state and a closed state. The convertor can also include a control circuit having an input node electrically coupled to a node within the load sub-circuit and an output node electrically coupled to the switch control node, the control circuit generating at the output node a periodic voltage signal adjustable to one or more operating frequencies based on a difference between a second control voltage at the input node and a reference voltage. In the converter, an inductance and a physical arrangement of the first inductive element is selected for the first inductive element to generate a permeating magnetic field that at least partially permeates a second inductive element electrically isolated from the first inductive element, where the permeating magnetic field induces a substantially self-resonant oscillation in the second inductive element for at least one of the operating frequencies. Furthermore, the control circuit is further configured to adjust the periodic voltage signal to adjust an internal voltage level at the internal node to minimize the difference.

BRIEF DESCRIPTION OF THE DRAWINGS

FIG. 3A shows the base unit of the inductive DC-DC converter circuit in FIG. 1 arranged according to a boost convertor topology.

FIG. 3B shows the base unit of the inductive DC-DC converter circuit in FIG. 1 arranged according to a buck-boost convertor topology.

DETAILED DESCRIPTION

Figure 1:
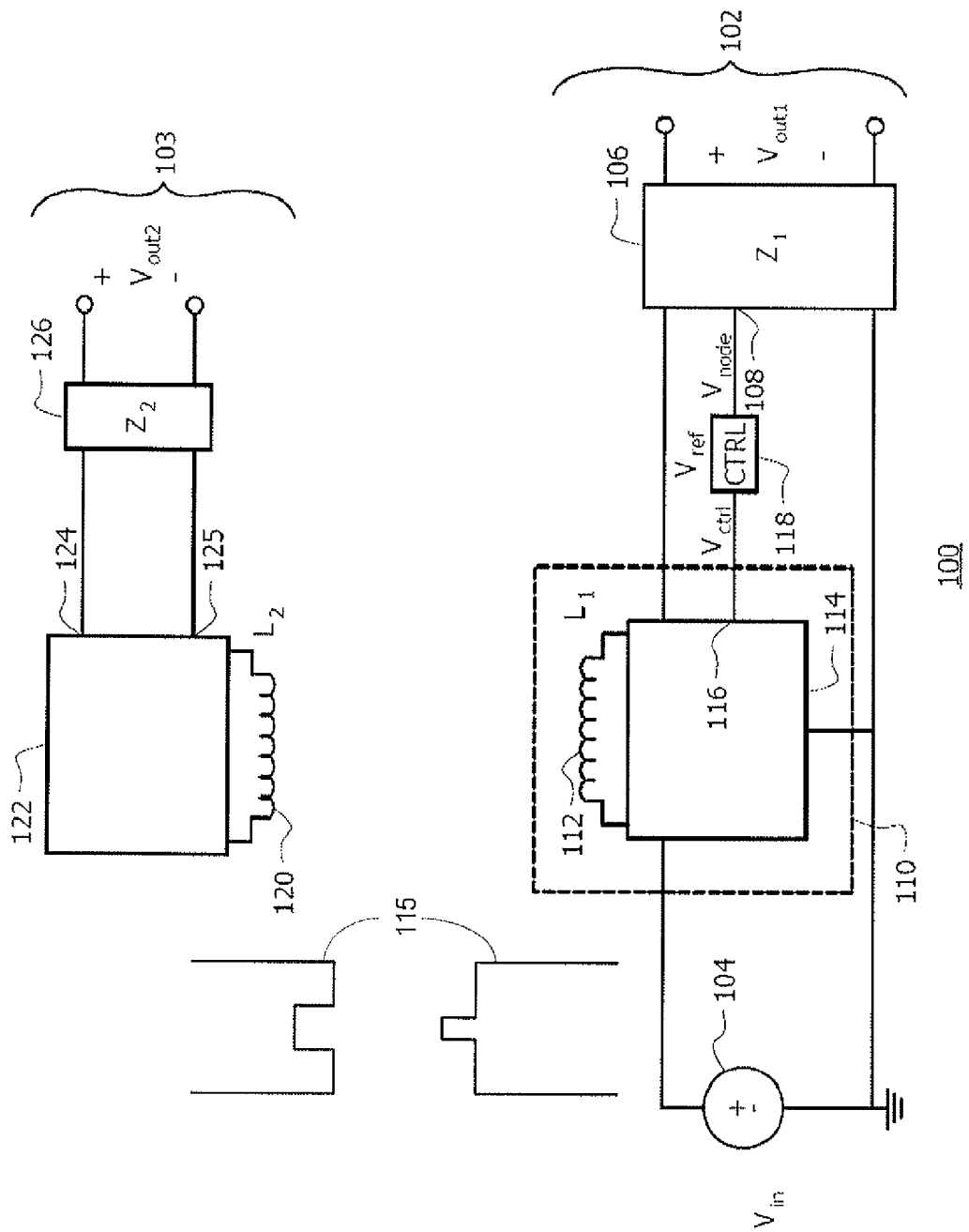
FIG. 1 shows a block diagram of a DC-DC converter circuit in accordance with an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

A block diagram of an inductive DC-DC converter circuit 100 for inductive power transfer in accordance with an embodiment of the present invention is shown in FIG. 1. The circuit 100 can include a base unit 102 providing input power and a target unit 103 providing output power, where the base unit 102 and the target unit 103 are electrically isolated. The target unit 103 can be electrically coupled to one or more electronic devices to provide power. By way of example, and not by way of limitation, these devices can include batteries, display units, keypads, and the like. The base unit 102 can include a DC voltage supply 104 for providing an input DC voltage (Vin). The base unit 102 can include a load 106 having an impedance Z1 having at least one internal node 108. In some embodiments, the load 106 can also be used to provide a wired output voltage Vout1. However, the invention is not limited in this regard and the load 106 can provide multiple output voltages.

As shown in FIG. 1, the DC voltage supply 104 and the load 106 are electrically coupled via a converter sub-circuit 110. The converter sub-circuit 110 includes an first inductive element 112 and a switching network 114 for directing current to or from the first inductive element 112 at an operating frequency. In FIG. 1, first inductive element 112 comprises an inductor L1. The switching network 114 can include an input node N2 for receiving a periodic voltage signal Vctrl for adjusting an operating frequency of the converter sub-circuit based on a voltage at node 108. The input node 116 and the internal node 108 can be electrically coupled via a controller element (CTRL) 118. The CTRL 118 can be configured to monitor the voltage Vnode at node 108 and to adjust Vctrl at node 116. Vctrl can be adjusted by CTRL 118 responsive to comparing Vnode to a reference voltage Vref. In some embodiments, as shown in FIG. 1, Vref can be provided to CTRL 118. In other embodiments, Vref can be internally generated. Details of the operation of the converter sub-circuit 110 and CTRL 118 will be described in further detail below with respect to FIGS. 2, 3A, and 3B.

In operation for inductive power transfer, the first inductive element 112 is utilized as the primary coil in the base unit 102 for transferring power to the target unit 103. In particular, the power can be transferred to the target unit 103 via a secondary coil formed from a second inductive element 120 in the target unit 103. As shown in FIG. 1, the secondary coil can be a second inductor L2. The second inductive element 120 can be electrically coupled to a rectifying element 122 for generating a DC voltage signal between node 124 and node 125 of the rectifying element 122 for the time-varying signal generated by the second inductive element 120 in response to coupling with the first inductive element 112. This generated DC voltage signal can then be applied across a second load 126 with an impedance Z2 in the target unit 103 to produce an output DC voltage Vout2.

One of ordinary skill in the art will recognize that the amount of power transferred from the base unit 102 to the target unit 103 is dependent on the amount of magnetic coupling between the first inductive element 112 and the second inductive element 120. In conventional designs, the amount of magnetic coupling is adjusted by matching the inductor coil design of the inductive elements 112, 120. However, this typically results in a base unit design compatible with only a particular target unit design, limiting the flexibility of the base unit to power additional target units. Furthermore, because a high degree of inductor coil matching is generally required, the operational margin for such base unit/target unit combinations is also limited.

An alternate method of efficiently transferring power between the base unit 102 and the target unit 103 is to provide operating conditions that result in a resistance of the primary coil to falls to approximately zero and an impedance of the secondary coil becoming increasingly resistive. This causes the input resistance of the primary coil to also become increasingly resistive and the amount of power transferred between the primary and secondary coils is also increased, as in a conventional power transfer, enhancing power transfer efficiency. This phenomena occurs when a least a portion of the time-varying magnetic field generated by a primary coil operated at one or more switching frequencies permeates the secondary coil and induces an oscillation in the secondary coil at its self resonant frequency, i.e., a self-resonant oscillation. Accordingly, in the various embodiments of the present invention, rather than attempting to precisely match the coil characteristics of the first inductive element 112 and the second inductive element 120, as in conventional designs, the switching network 114 is used to adjust the operating frequency of the existing first inductive element 112. The operating frequency can then be adjusted until the self-resonant oscillation is induced in the second inductive element 120. The operating frequency for the base unit for inducing the self-resonant oscillation in the second inductive element can vary depending on the separation between the first inductive element 112 and the second inductive element 120, as the separation affects the magnetic field inducing an oscillation in the second inductive element 120. Additionally, the operating frequency for the base unit can also vary depending on the configuration of the rectifying element 122 and the second load 126.

Therefore, in the various embodiments of the present invention, a first inductive element 112 configuration can be selected such that, for at least at one operating frequency, magnetic coupling to the second inductive element 120 at a pre-determined distance occurs that transfers power proportional to a simple voltage divider of the load 106 and the input resistance of the first inductive element 112. Although inducing a self resonant oscillation provides the most efficient power transfer, the invention is not limited in this regard. In the some embodiments of the present invention, the inductive DC-DC converter 100 can be configured operate in proximity to the self-resonant frequency, albeit at a reduced efficiency. That is, if the oscillation at the second inductive element 120 does not occur at its self-resonant frequency, the input resistance of the primary coil (the first inductive element 112) is decreased. As a result, the amount of power transferred is also decreased, decreasing power transfer efficiency.

Although the first inductive element 112 can be paired with any type of switching network to adjust an operating frequency, a converter sub-circuit comprising a DC-DC switching mode power supply circuit (SMC circuit) can be used to provide both the first inductive element 112 and the switching network 114. SMC circuits are designed to convert one DC voltage to another by storing energy in a magnetic component (typically an inductor or a transformer) for a period of time. In operation, adjustment of the duty cycle (the ratio of on/off time) of a switching element within the SMC circuit adjusts the amount of power transferred to a load in the SMC circuit. More importantly, by adjusting the duty cycle, the operating frequency of the magnetic component (the inductor) in SMC circuit can also be adjusted. Accordingly, one aspect of present invention provides for using an SMC circuit to provide the converter sub-circuit 110.

In order to provide operation of the second inductive element 120 at its self resonant frequency, the CTRL 118 can be configured to indirectly monitor the amount of power transferred to the second inductive element 120 by monitoring the voltage generated across at least a portion of the load 106. That is, as the frequency of oscillation in the second inductive element 120 approaches its self-resonant frequency, the input impedance of the first inductive element 112 becomes substantially more resistive and the amount of power transferred to the target unit 103 increases. Consequently, the voltage dropped across other portions of the base unit, including the load 106, approaches the values expected for a substantially resistive input impedance for the first inductive element 112. Accordingly, by configuring the CTRL 118 to monitor the voltage level at a node of the load 106, such as Vnode at node 108, the CTRL 118 can adjust the duty cycle for the SMC circuit to cause a particular voltage level at node 108. Therefore, the amount of power the amount of power transferred to the target unit 103 is effectively controlled and maximized. In some configurations of the inductive DC-DC converter 200, minimizing the voltage value Vnode at node 108 can result in a self-resonant oscillation in the second inductive element. However, in other configurations of the inductive DC-DC converter 200, even after such minimizing of Vnode, the second inductive element 120 may still not oscillate at its self-resonant frequency. For example, if processing variations result in variations in the first and second inductive elements 112, 120 (or any other elements), the self-resonant frequency expected for the second inductive element 120 can vary and a different voltage value for Vnode can be needed to maximize power transfer. Accordingly, in such cases, the power transfer still occur, albeit at a lower efficiency, until a new voltage value for Vnode is selected. An inductive DC-DC converter using an SMC circuit is conceptually illustrated with respect to FIG. 2.

Figure 2:
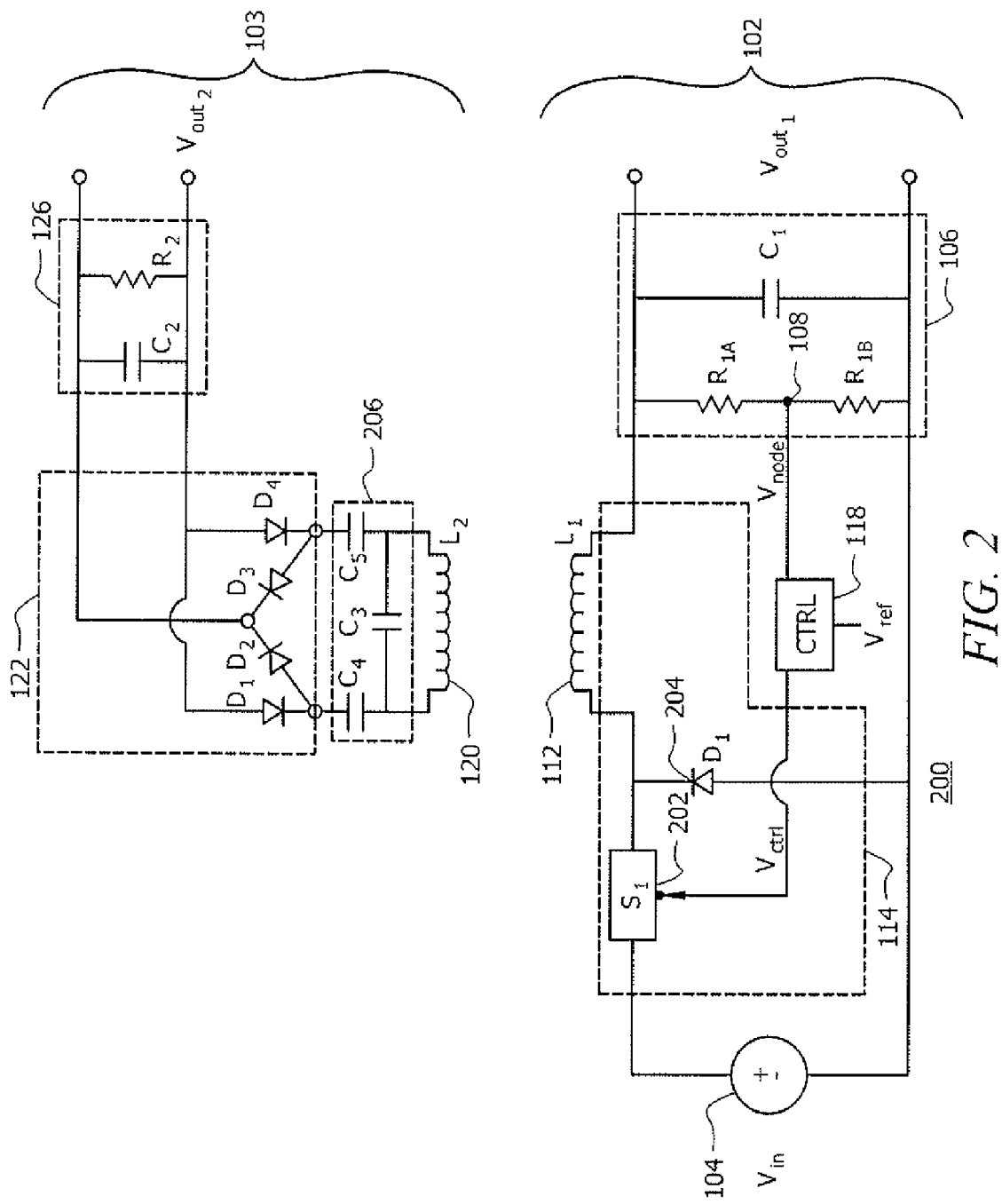
FIG. 2 shows a schematic of a DC-DC converter circuit in FIG. 1 using a buck converter topology in the base unit and a full-waver rectifier circuit in the target unit.

FIG. 2 shows a schematic of an inductive DC-DC converter circuit 200 including an SMC circuit, in particular a buck convertor topology. In FIG. 2, the circuit 200 includes a base unit 102 and a target unit 103, as previously described with respect to FIG. 1. However, in FIG. 2, the first inductive element 112 and the switching network 114 are configured as an SMC circuit having a buck converter topology. A switch element 202, a rectifying element 204, and the first inductive element 112 are arranged such that when switch element 202 is closed, the current path in circuit 200 follows a loop formed by the DC voltage supply 104, the first inductive element 112, and the load 106. When the switch element 202 is open, the current path in circuit 200 follows a loop formed by the rectifier element 204, the first inductive element 112, and the load 106. Accordingly, first inductive element 112, rectifier element 204, and switching element 202 can be referred to collectively as an SMC sub-circuit 112, 204, 202.

In some embodiments of the present invention, the switch element 202 comprises a single switch S1 having a control node N2 that responds in a control signal. The single switch S1 can comprise any type of electrically controlled switch, including, but not limited to, bipolar junction (BJT) transistors and field effect (FET) transistors. In such devices, the control node N2 can comprise the base of the BJT or the gate of the FET transistor. As shown in FIG. 2, the rectifying element 204 can comprise a diode D1. However, the invention is not limited in this regard. In some embodiments, the rectifying element 204 can also comprise any type of synchronously electrically controlled switch, including, but not limited to, bipolar junction (BJT) transistors and field effect (FET) transistors. That is, a switch that closes when switch S1 is open and vice versa. In such embodiments, the control signal for the rectifying element 204 can be a complement or inverse of the control signal being provided to the switch element 202.

As shown in FIG. 2, the load 106 includes resistors R1A and R1B and capacitor C1. However, the invention is not limited to solely this configuration for the load 106 and any combination of resistors, capacitors, and inductors can be used to form the load 106. In FIG. 2, node 108 is the common node between resistors R1A and R1B. Additionally, as previously described, the load 106 can be used to provide an output voltage Vout1.

As previously described, the target unit 103 includes a second inductive element 120, a rectifier circuit 122, and a load 126. As shown in FIG. 2, the rectifier element 122 can include diodes D1-D4 in a full-wave rectification configuration for generating a DC voltage signal from the time-varying signal generated by the second inductive element 120. However, the invention is not limited in this regard. For example, any arrangement of components suitable for half-wave rectification or full-wave rectification can be used with the various embodiments of the present invention. Also as shown in FIG. 2, the load 126 in the target unit 103 includes a capacitor C2 and a resistor R2. However, the invention is not limited in this regard and any combination of resistors, capacitors, and/or inductors can be used in load 126.

In some embodiments, to improve magnetic coupling between the first and second inductive elements 112, 120, a capacitor network 206 can be used to electrically couple the second inductive element 120 to the rectifier circuit 122. Such a capacitive network 206 can include one or more capacitors (C3) in parallel with the second inductive element 120. The capacitive can also include one or more capacitors (C4, C5) to electrically couple the second inductive element 120 to the rectifier circuit 122. The capacitive network 206 can be used to reduce the imaginary component in the target unit 103, thus presenting a more resistive load without altering the operating frequency in the base unit 102 required for inducing a self-resonant oscillation in the second inductive element 120.

In operation, circuit 200 provides an output voltage Vout2 as follows. First, the base unit 102 and the target unit 103 are placed and aligned in relative proximity to each other. Since the fields lines of the magnetic field generated by the base unit will have a particular direction, the second inductive element 120 can be positioned in the path of the field lines of the generated magnetic field. For example in the case of hand-wired air coil inductors having inductances between 100 nH and 500 nH and an utilizing operating frequency of 1-4 MHz, the first and second inductive elements can to be positioned within a distance of 10-15 cm or less to maximize power transfer. This distance, however, can vary depending on the amount of power being transferred, the operating frequency, and the inductances of the inductor coils. Furthermore, in the case of inductor coils, the coil axis of each of the inductor coils can be placed along a common parallel direction. That is, an arrangement can be selected such that the dot product of the directional vector for an axis of each of the inductor coils is chosen to be one or approximately one. However, precise alignment is not required in the various embodiments of the present invention and the directional vectors need only be substantially parallel. For example, the Present Inventors have found that the alignment variation to cause a 10% decrease in power transfer efficiency is >25 degrees. In some embodiments of the present invention, a positioning structure (s) 115, such as contacting or interlocking protrusions or edges can be provided on a support and/or housing of the base unit 102 and/or the target unit 103 to facilitate alignment.

Although exemplary types of inductor coils, are described above, the invention is not limited in this regard. For example, any type of discrete inductor coils, including but not limited to cylindrical inductor coils, single or multilayer inductor coils, wire spiral inductor coils, and toroidal inductor coils can be used in the various embodiments of the present invention. Furthermore, integrated inductor coils, such as printed circuit board (PCB) micro-strip spiral coils or spiral coils formed on an integrated circuit (IC) can also be used with the various embodiments of the present invention. Additionally, the inductance values and operating frequencies presented above are for illustrative purposes only. For example, in some other embodiments, the inductances values can be 1-100 uH and the corresponding operating frequencies can be 400-500 MHz. However, the present invention is not limited in this regard. Any combination of operating frequencies and inductance values can be used in the various embodiments of the present invention.

After the first and second inductive elements 112, 120 are positioned and aligned, an input voltage Vin can be provided by the DC input supply 104 and a control signal can provided at node 116 of the switching element 202 (and rectifier element 204, if applicable) by CTRL 118 based on the voltage Vnode at node N1. As previously described, CTRL 118 is configured to provide a periodic voltage signal, where the frequency of the periodic voltage signal Vctrl specifies the duty cycle for the switching element 202. Although the buck converter topology shown in FIG. 2 is typically operated using a square wave signal, the invention is not limited in this regard. Other types of periodic voltage signals, including, but not limited to sinusoidal, triangular, or sawtooth waveforms can also be generated by CTRL 118.

As a result of the periodic voltage signal Vctrl, the CTRL 118 causes the switching element 202 to open and close at a frequency of Vctrl. Consequently, the base unit 102 alternates between the two current paths described above. As a result of these alternating current paths, the first inductive element 112 continually charges and discharges. However, one of ordinary skill in the art will recognize that the buck convertor topology provides a steady state voltage output voltage Vout1 across load 106. Furthermore, as a constant voltage results across load 106, a steady-state output voltage Vnode also develops at node 108.

As noted above, the voltage dropped across the load 106 can be predicted when the second inductive element 120 is at its self-resonant frequency. Consequently, the voltage at an inner node of the load 106 (Vctrl) can also be predicted. Therefore, by utilizing Vref as a setpoint for Vctrl, CTRL 118 can adjust the duty cycle of for the SMC sub-circuit 112, 202, 204, which adjusts the operating frequency of the first inductive element 112 and thus the amount of power transferred to the target unit 103. Accordingly, as conditions vary, whether due to changes in the placement of the base unit 102 relative to the target unit 103 or due to changes in the characteristics of components in the base unit 102 or the target unit 103, the CTRL 118 can compare Vnode to Vref and compensate Vctrl appropriately. For example, if the CTRL 118 detects a difference between Vnode and Vref, the duty cycle can be adjusted until the difference is minimized.

Therefore, in the various embodiments of the present invention, the CTRL 118 can include logic for determining a value of Vctrl from Vnode and Vref values. In one exemplary embodiment, the logic can comprise logic for accessing a lookup table for adjusting Vctrl. In another exemplary embodiment, the logic can comprise logic that adjusts Vctrl based on an actual difference between Vctrl and Vref, a magnitude of this actual difference, or both. These exemplary embodiments are provided by way of example and not by way of limitation. One of ordinary skill in the art will readily recognize that various methods and devices for implementing CTRL 118 are available. For example, a power supply can include a circuit for automatically adjusting the frequency of operation for the pulse width modulation being used by implementing an error amplifier for obtaining a value for Vctrl based on Vref and Vnode.

The present invention is not limited to a buck converter topology. In other embodiments of the invention, the arrangement of the first inductive element 112, the switch element 202, and the rectifying element 204 in the base unit can be changed to provide alternative topologies for the SMC sub-circuit 112, 202, 204 in FIG. 2. For example, in some embodiments, a boost converter topology or an buck-boost or inverting converter topology can be used.

FIG. 3A shows a first alternate base unit 300 for the circuit in FIG. 2 having a first alternate topology for the SMC sub-circuit in FIG. 2 in accordance with another embodiment of the present invention. As shown in FIG. 3A, the arrangement of the first inductive element 112, the switching element 202, and the rectifying element 204 in the base unit 300 provides a boost converter topology. That is the switch element 202, the rectifying element 204, and the first inductive element 112 are arranged such that when switch element 202 is closed, the current path in base unit 300 follows a loop comprising the DC voltage supply 104, the first inductive element 112, and the closed switching element 202. When the switching element 202 is open, the current path in the base unit 300 follows a loop comprising the DC voltage supply 104, the first inductive element 112, the rectifier element 204, and the load 106.

FIG. 3B shows a second alternate base unit 350 for the circuit in FIG. 2 having a second alternate topology for the SMC sub-circuit in FIG. 2 in accordance with yet another embodiment of the present invention. As shown in FIG. 3B, the arrangement of the first inductive element 112, the switching element 202, and the rectifying element 204 in the base unit 300 provides a buck-boost or inverting converter topology. That is, the switch element 202, the rectifying element 204, and the first inductive element 112 are arranged in base unit 350 such that when switch element 202 is closed, the current path in base unit 300 follows a loop comprising the DC voltage supply 104, and the closed switching element 202, and the first inductive element 112. In the buck-boost topology, the rectifying element 204 blocks current from reaching the load 106. When the switching element 202 is open, the current path in the base unit 300 follows a loop comprising the rectifier element 204, the first inductive element 112, and the load 106.

The exemplary SMC sub-circuit configurations in FIGS. 2, 3A, and 3B are presented by way of example and not by way of limitation. In other embodiments, other combinations and arrangements of inductive elements, switching elements, and rectifying elements can be provided. For example, in some embodiments, multiple inductive elements can be provided for transferring power to multiple target units. Regardless of how the SMC sub-circuit is configured, by continually adjusting Vnode to Vref, the SMC circuit can maintain an efficient transfer of power to the target unit. This is illustrated by the data shown in FIG. 4.

Figure 4:
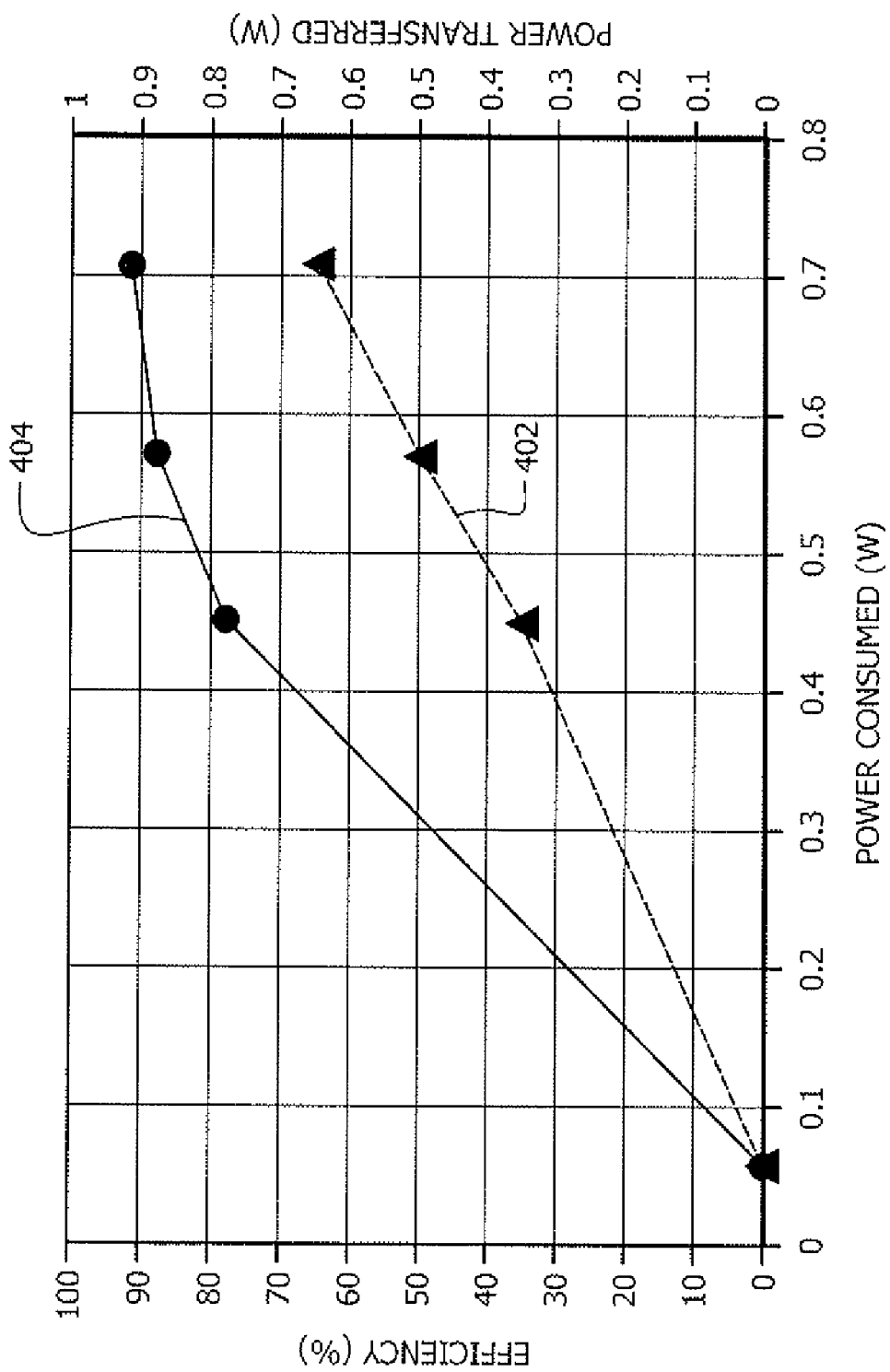
FIG. 4 is a plot showing power efficiency and power transferred as a function of input power consumed for an inductive DC-DC converter circuit having a buck converter topology in accordance with an embodiment of the present invention.

FIG. 4 is a plot showing power efficiency and power transferred versus power consumed for an inductive DC-DC converter circuit configured in accordance with an embodiment of the present invention using a buck converter topology. The base unit was implemented using a DC785 high frequency buck converter, manufactured by LINEAR TECHNOLOGY CORPORATION, but with the original inductor replaced with a hand-wound inductor of approximately 150 nH. The target unit was implemented using a MBR160 diode, manufactured by ON SEMICONDUCTOR, modified to include a hand-wound inductor of approximately 500 nH. A dynamic load was used to measure the output power.

As shown in FIG. 4, curve 402 shows the amount of power transferred to the target unit as a function of the amount of power consumed in the base unit. Curve 404 shows the efficiency of the power transfer versus the amount of power consumed. As shown in curves 402 and 404, as the amount of power transferred by the inventive circuit is substantially proportional to the amount of the power consumed. Furthermore, as the amount of power consumed is increased, the amount of power transferred and the efficiency of the transfer process is also increased. For example, when ~0.45 W of power is consumed, ~77% of the consumed power is being transferred. However, when ~0.7 W of power is consumed, ~92% of the consumed power is consumed. Accordingly, for higher power transfers, the SM circuit provides an increased efficiency power transfer as compared to conventional methods, such as coil driver-based, class-E amplifier-based, or error amplifier-based inductive DC-DC converters.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

What is claimed is:

1. A method for inductively transferring power from a base unit providing input power, to a target unit providing output power, where the base unit and the target unit are electrically isolated, comprising:

positioning a second inductive element of said target unit within a predetermined distance of a first inductive element of said base unit;

applying a time varying electric current to said first inductive element to produce a time varying magnetic field, said time varying magnetic field induces an electric current in said second inductive element;

monitoring at least one parameter indicative of an efficiency of power transfer from said base unit to said target unit;

automatically adjusting at least one characteristic of said time varying electric current responsive to said parameter to maximize an efficiency of power transfer from said base unit to said target unit.

2. The method according to claim 1, wherein said characteristic comprises at least one of a frequency of said time varying current and a duty cycle of said time varying current.

3. The method according to claim 1, further comprising producing said time varying electric current by switching a DC voltage source using an electronically controlled switch element.

4. The method according to claim 3, further comprising communicating said time varying electric current to a load in said base unit, and selecting said parameter to be a measured current or voltage associated with said load.

5. The method according to claim 4, further comprising comparing said measured current or voltage to a constant reference value.

6. The method according to claim 1, further comprising producing said time varying magnetic field with a DC to DC type switching mode power supply circuit.

7. The method according to claim 6, further comprising utilizing said first inductive element as a primary energy storage component in a DC to DC conversion process of said DC to DC type switching mode power supply circuit.

8. The method according to claim 1, wherein said automatically adjusting step further comprises automatically adjusting said characteristic to induce an oscillation in said second inductive element at a frequency to be approximately equal to a self-resonant frequency of said second inductive element.

9. The method according to claim 1, further comprising responsive to a re-positioning of said second inductive element from a first position to a second position, automatically selectively re-adjusting said characteristic to maximize said efficiency, wherein said first position differs from said second position with regard to at least one characteristic selected from the group consisting of distance and orientation relative to said first inductive element.

10. The method according to claim 1, further comprising responsive to a substitution of a target unit with a different target unit, automatically selectively re-adjusting said characteristic to maximize said efficiency.

11. The method according to claim 1, further comprising rectifying an output current induced in said second inductive element to produce a DC output.

12. An inductive power transfer system, comprising:

a base unit comprising a first inductive element configured for providing input power to a second inductive element of a target unit providing output power, said base unit electrically isolated from said target unit;

a positioning structure provided on at least one of said base unit and said target unit for removably positioning said second inductive element at a predetermined orientation and distance relative to said first inductive element;

a switch element configured for selectively applying a time varying electric current to said first inductive element to produce a time varying magnetic field, said time varying magnetic field inducing an electric current in said second inductive element; and a control circuit configured for monitoring at least one parameter indicative of an efficiency of power transfer from said base unit to said target unit, and automatically adjusting at least one characteristic of said time varying electric current responsive to said parameter to maximize an efficiency of power transfer from said base unit to said target unit.

13. The system of claim 12, wherein said characteristic comprises at least one of a frequency of said time varying current and a duty cycle of said time varying current.

14. The system of claim 12, wherein said switch element is electronically controlled, and wherein said switch element is configured for coupling and decoupling a DC voltage source to said first inductive element to produce said time varying current.

15. The system of claim 14, further comprising a load circuit coupled to said first inductive element, and where said parameter comprises a current or voltage associated with said load.

16. The system of claim 15, wherein said control circuit automatically selectively adjusts said characteristic based on a comparison of said measured current or voltage to a constant reference value.

17. The system of claim 12, wherein said base unit further comprises a DC to DC type switching mode power supply, said DC to DC type switching mode power supply producing said time varying magnetic field.

18. The system of claim 17, wherein said first inductive element comprises a primary energy storage component of said DC to DC type switching mode power supply.

19. The system of claim 12, wherein said control circuit is further configured during said automatically adjusting for automatically selectively adjusting a frequency to be approximately equal to a self-resonant frequency of said second inductive element.

20. The system of claim 12, wherein said control circuit is further configured during said automatically adjusting for automatically selectively re-adjusting a frequency to maximize said efficiency responsive to a re-positioning of said second inductive element from a first position to a second position, wherein said first position differs from said second position with regard to at least one characteristic selected from the group consisting of distance and orientation relative to said first inductive element.

21. The system of claim 12, wherein said control circuit is further configured during said automatically adjusting for automatically selectively re-adjusting a frequency to maximize said efficiency responsive to a substitution of a target unit with a different target unit.

22. The system of claim 12, wherein said target unit further comprises a rectifying element configured to produce a DC output by rectifying an output current induced in said second inductive element.

23. A DC-DC converter, comprising:
an input circuit for receiving a DC input voltage;
an output circuit electrically coupled to said input circuit, said output circuit comprising a load sub-circuit electrically coupled to a converter sub-circuit, said converter sub-circuit comprising at least a first inductive element and at least one switch element having a switch control node, said switch control node responsive to a first control voltage for selectively alternating said switch element between an open state and a closed state; and
a control circuit having an input node electrically coupled to a node within said load sub-circuit and an output node electrically coupled to said switch control node, said control circuit generating at said output node a periodic voltage signal adjustable to one or more operating frequencies based on a difference between a second control voltage at said input node and a reference voltage;
wherein an inductance and a physical arrangement of said first inductive element is selected for said first inductive element to generate a permeating magnetic field that at least partially permeates a second inductive element electrically isolated from said first inductive element, wherein said permeating magnetic field induces a substantially self-resonant oscillation in said second inductive element for at least one of said operating frequencies, and wherein said control circuit is further configured to adjust said periodic voltage signal to adjust a voltage level at said input node to minimize said difference.

24. The DC-DC converter of claim 23, wherein said first or second inductive element comprises at least a first inductor.

25. The DC-DC converter of claim 24, wherein a first directional vector defining a first inductor coil axis of said first inductive element and a second directional vector defining a second inductor coil axis of said second inductive element are substantially parallel.

26. The DC-DC converter of claim 23, wherein an operating frequency of said converter sub-circuit is at least 1 MHz, and wherein said first inductive element has an inductance of at least 100 nH.

27. The DC-DC converter of claim 23, wherein said first inductive element and said switch element are electrically coupled in series between said input circuit and said load sub-circuit, and wherein said converter sub-circuit further comprises a rectifier element electrically coupled to a common node between said first inductive element and said switch element.

28. A method for inductively transferring power from a base unit providing input power, to a target unit providing output power, where the base unit and the target unit are electrically isolated from each other, comprising:
positioning a second inductive element of said target unit within a predetermined distance of a first inductive element of said base unit;
applying a time varying electric current to said first inductive element to produce a time varying magnetic field having an operating frequency, said time varying magnetic field inducing an electric current in said second inductive element;
monitoring at least one parameter of an electronic component of said base unit that is indicative of an efficiency of power transfer from said base unit to said target unit; and
automatically adjusting said operating frequency based on a value of said parameter to maximize said efficiency of power transfer from said base unit to said target unit.

* * * * *